(12) United States Patent
Chae et al.

(10) Patent No.: US 11,049,293 B2
(45) Date of Patent: Jun. 29, 2021

(54) IMAGE GENERATING APPARATUS, IMAGING SYSTEM INCLUDING IMAGE GENERATING APPARATUS AND OPERATING METHOD OF IMAGING SYSTEM

(71) Applicant: Electronics and Telecommunications Research Institute, Daejeon (KR)

(72) Inventors: Seung-Hoon Chae, Daejeon (KR); Sooyeul Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 162 days.

(21) Appl. No.: 16/546,986

(22) Filed: Aug. 21, 2019

(65) Prior Publication Data

US 2020/0074699 A1 Mar. 5, 2020

(30) Foreign Application Priority Data

Aug. 29, 2018 (KR) .......................... 10-2018-0102286

(51) Int. Cl.
*G06T 11/00* (2006.01)
*G01B 11/25* (2006.01)

(52) U.S. Cl.
CPC ............ *G06T 11/005* (2013.01); *G01B 11/25* (2013.01); *G06T 2211/408* (2013.01)

(58) Field of Classification Search
CPC ............ G06T 11/006; G06T 2211/424; G06T 11/005; G06T 11/008; G06T 2207/10081;
(Continued)

(56) References Cited

U.S. PATENT DOCUMENTS 5,442,674 A 8/1995 Picard et al.
6,804,321 B2 10/2004 Katsevich
(Continued)

FOREIGN PATENT DOCUMENTS

KR 10-1495136 B1 2/2015
KR 10-2015-0095140 A 8/2015
KR 10-1621815 B1 5/2016

OTHER PUBLICATIONS

Han et al., Geometrical Calibration System for Rotating Bi-Planar Radiography Instrument, Feb. 2018 [retrieved Mar. 26, 2021], International Journal of New Technology and Research, vol. 4, Issue 2, pp. 22-27. Retrieved: (Year: 2018).*
[Item U continued] https://www.neliti.com/publications/263143/geometrical-calibration-system-for-rotating-bi-planar-radiography-instrument (Year: 2018).*
(Continued)

*Primary Examiner* — Andrew M Moyer
*Assistant Examiner* — Dennis Rosario
(74) *Attorney, Agent, or Firm* — Rabin & Berdo, P.C.

(57) ABSTRACT

Provided is an operating method of an imaging system, the operating method including illuminating, by a light illuminator, light onto a subject from a light source, acquiring, by an optical detector, a two-dimensional projection image on the subject, generating a first projection matrix between three-dimensional coordinates of the subject and two-dimensional coordinates of the projection image, generating a three-dimensional first volume image on the subject on the basis of the first projection matrix and the projection image, generating a two-dimensional digitally reconstructed radiograph (DRR) on the subject from the first volume image, matching the projection image and the DRR, and updating the first projection matrix on the basis of a matched result to generate a second projection matrix, and generating a three-dimensional second volume image on the subject on the basis of the second projection matrix and the projection image.

19 Claims, 9 Drawing Sheets

(58) Field of Classification Search
CPC ..... G06T 2207/30004; G06T 2211/421; A61B 6/032
See application file for complete search history.

(56) References Cited

U.S. PATENT DOCUMENTS

| | | | |
|---|---|---|---|
| 8,422,764 | B2 | 4/2013 | Ye et al. |
| 8,666,133 | B2 | 3/2014 | Vermandel et al. |
| 10,143,433 | B2 | 12/2018 | Kim et al. |
| 10,478,148 | B2 * | 11/2019 | Siewerdsen ............ A61B 6/501 |
| 2007/0276215 | A1 | 11/2007 | Ziegler |
| 2012/0128235 | A1 | 5/2012 | Lee et al. |
| 2015/0030227 | A1 | 1/2015 | Liang et al. |
| 2016/0199147 | A1 | 7/2016 | Shin |
| 2017/0238897 | A1 | 8/2017 | Siewerdsen et al. |
| 2018/0068467 | A1 | 3/2018 | Wang et al. |

OTHER PUBLICATIONS

DeLorenzo et al., Image-Guided Intraoperative Cortical Deformation Recovery Using Game Theory: Application to Neocortical Epilepsy Surgery, Feb. 2010 [retrieved Mar. 26, 2021], IEEE Transactions on Medical Imaging, vol. 29, Issue: 2, pp. 322-338. Retrieved:https://ieeexplore.ieee.org/abstract/document/54 (Year: 2010).*

DeLorenzo et al., Nonrigid 3D Brain Registration Using Intensity/Feature Information, Oct. 1, 2006 [retrieved Mar. 26, 2021], 2006 International Conference on Medical Image Computing and Computer-Assisted Intervention, pp. 932-939. Retrieved: https://link.springer.com/chapter/10.1007/11866565_114 (Year: 2006).*

J. H. Siewerdsen, et al., "Volume CT with a flat-panel detector on a mobile, isocentric C-arm: Pre-clinical investigation in guidance of minimally invasive surgery", Medical Physics, vol. 32, pp. 241-254, Jan. 1, 2005.

* cited by examiner

Cross Section Of V(0)

Cross Section Of V(3)

IMAGE GENERATING APPARATUS, IMAGING SYSTEM INCLUDING IMAGE GENERATING APPARATUS AND OPERATING METHOD OF IMAGING SYSTEM

CROSS-REFERENCE TO RELATED APPLICATIONS

This U.S. non-provisional patent application claims priority under 35 U.S.C. § 119 of Korean Patent Application No. 10-2018-0102286, filed on Aug. 29, 2018, the entire contents of which are hereby incorporated by reference.

BACKGROUND

The present disclosure herein relates to an imaging system, and more particularly, to an imaging system for precisely figuring out a geometrical relationship among a light source, a subject, and an optical detector to improve the quality of a three-dimensional CT image.

A cone beam computed tomography (CT) system includes an X-ray source and an X-ray detector. The X-ray source and the X-ray detector may rotate about a subject to acquire a plurality of two-dimensional projection images. In order to generate a three-dimensional image from the acquired two-dimensional projection images, it is required that a positional relationship among the X-ray source, the X-ray detector, and the subject at the time of acquiring the projection images is accurately determined. When the positional relationship among the X-ray source, the X-ray detector and the subject is not accurately determined, the quality of the three-dimensional image on the subject may be reduced.

In the cone beam CT system, in order to capture an image of the subject, the X-ray source and a gantry, which is a frame configured to support the X-ray detector, may rotate along a track. When a rotary orbit of the gantry is possibly and accurately determined, the positional relationship among the X-ray source, the X-ray detector, and the subject may be accurately determined. However, it is difficult to accurately determine the rotary orbit of the gantry due to the occurrence of structural deflection of the gantry or deformation of the rotary orbit. Therefore, it is difficult to accurately determine the positional relationship among the X-ray source, the X-ray detector and the subject. Accordingly, the quality of the three-dimensional image on the subject may be reduced.

SUMMARY

The present disclosure provides an imaging system capable of improving the definition of a three-dimensional image for a subject, when a rotary orbit of the gantry may not be accurately determined.

An embodiment of the inventive concept provides an operating method of an imaging system, the operating method including: illuminating, by a light illuminator, light onto a subject from a light source; acquiring, by an optical detector, a two-dimensional projection image on the subject; generating a first projection matrix between three-dimensional coordinates of the subject and two-dimensional coordinates of the projection image; generating a three-dimensional first volume image on the subject on the basis of the first projection matrix and the projection image; generating a two-dimensional digitally reconstructed radiograph (DRR) on the subject from the first volume image; matching the projection image and the DRR, and updating the first projection matrix on the basis of a matched result to generate a second projection matrix; and generating a three-dimensional second volume image on the subject on the basis of the second projection matrix and the projection image.

In an embodiment, the projection matrix may be generated using a distance from the optical source to a center of the optical detector, a distance from the light source and a center of the subject, a revolution angle of the light source, an azimuth angle of the light source, and center coordinates of the optical detector, and when three-dimensional coordinates of the subject is expressed in (X, Y, Z) coordinates and the light illuminator and the optical detector revolve around a Z-axis, the center of the subject may be a point at which a line, which connects the light source and the center of the optical detector, meets the Z-axis, the revolution angle may be an angle calculated on the basis of a Y-axis when the light source is vertically projected onto an X-Y plane, and the azimuth angle may be an angle made by the light source S and the X-Y plane.

In an embodiment, the generating of the first volume image may include: acquiring a two-dimensional coordinate value of the projection image, which corresponds to a three-dimensional coordinate value of the subject, using the first projection matrix; and accumulating a pixel value of the two-dimensional coordinate value of the projection image to a pixel value of the three-dimensional coordinate value of the subject.

In an embodiment, the generating of the DRR may include: acquiring a two-dimensional coordinate value of the DRR, which corresponds to a three-dimensional coordinate value of the subject, using the first projection matrix; and accumulating a pixel value of a three-dimensional coordinate value of the first volume image to the pixel value of the two-dimensional coordinate value of the DRR.

In an embodiment, the generating of the second projection matrix may include: translating and rotating one of the projection image and the DRR to calculate a similarity between the projection image and the DRR; and updating the first projection matrix using a translation value and a rotation value of a case where the similarity is a highest.

In an embodiment, the updating of the first projection matrix may include: calculating a first transform matrix on the basis of center coordinates of the optical detector the rotation value and the translation value; calculating a second transform matrix on the basis of the first transform matrix and the rotation value; and multiplying the second transform matrix by the first projection matrix to calculate the second projection matrix.

In an embodiment, the first transform matrix may be $$TR = \left[ \begin{pmatrix} u_0 \\ v_0 \end{pmatrix} - \begin{pmatrix} \cos(r) & \sin(r) \\ -\sin(r) & \cos(r) \end{pmatrix} \begin{pmatrix} u_0 + Tu \\ v_0 + Tv \end{pmatrix} \right],$$

the second transform matrix may be $$VAR = \begin{bmatrix} \cos(r) & \sin(r) & TRu \\ -\sin(r) & \cos(r) & TRv \\ 0 & 0 & 1 \end{bmatrix}$$

wherein $u_0$ and $v_0$ denote the central coordinate values of the optical detector, r denotes the rotation value, Tu and Tv denote translation values, TRu denotes a first row value of the first transform matrix, and TRv denotes a second row value of the first transform matrix.

In an embodiment, the generating of the second volume image may include: acquiring a two-dimensional coordinate value of the projection image, which corresponds to a three-dimensional coordinate value of the subject, using the second projection matrix; and accumulating a pixel value of the two-dimensional coordinate value of the projection image to the pixel value of the three-dimensional coordinate value of the subject.

In an embodiment of the inventive concept, an imaging system includes: a light illuminator configured to illuminate light onto a subject from a light source; an optical detector configured to acquire a two-dimensional projection image on the subject; and an image generation device configured to generate a three-dimensional volume image on the subject on the basis of the projection image, wherein the image generation device includes: a projection matrix generation module configured to generate a first projection matrix between three-dimensional coordinates of the subject and two-dimensional coordinates of the projection image; a volume image generation module configured to generate a three-dimensional first volume image on the subject on the basis of the first projection matrix and the projection image; a DRR generation module configured to generate a two-dimensional DRR on the subject from the first volume image; and a projection matrix updating module configured to match the projection image and the DRR, and update the projection matrix on the basis of a matched result to generate a second projection matrix, wherein the volume image generation module further generates a three-dimensional second volume image on the subject on the basis of the second projection matrix and the projection image.

In an embodiment, the volume image generation module may be configured to: acquire the two-dimensional coordinate value of the projection image, which corresponds to the three-dimensional coordinate value of the subject using the first projection matrix, and accumulate a pixel vale of the two-dimensional coordinate value of the projection image to a pixel value of the three-dimensional coordinate value of the subject to generate the first volume image; and acquire the two-dimensional coordinate value of the projection image, which corresponds to the three-dimensional coordinate value of the subject, using the second projection matrix, and accumulates a pixel vale of the two-dimensional coordinate value of the projection image to the pixel value of the three-dimensional coordinate value of the subject to generate the second volume image.

In an embodiment, the projection matrix updating module may be configured to: translate and rotate one of the projection image and the DRR to calculate a similarity between the projection image and the DRR; and update the first projection matrix using a translation value and a rotation value of a case in which the similarity is a highest.

In an embodiment, the projection matrix updating module may be configured to: calculate the first transform matrix on the basis of the central coordinates of the optical detector, the translation value and the rotation value; calculate the second transform matrix on the basis of the first transform matrix and the rotation value; and multiply the second transform matrix by the first projection matrix to calculate the second projection matrix.

In an embodiment of the inventive concept, an image generation device, which generates a three-dimensional volume image on a subject from a two-dimensional projection image acquired by illuminating light onto the subject, includes: a processor; and a memory connected to the processor, wherein the memory stores commands, and when the commands are executed by the processor, the commands cause the processor to: generate a first projection matrix between three-dimensional coordinates of the subject and two-dimensional coordinates of the projection image; generate a three-dimensional first volume image on the subject on the basis of the first projection matrix and the projection image; generate a two-dimensional DRR on the subject from the first volume image; match the projection image and the DRR, and update the first projection matrix on the basis of a matched result to generate a second projection matrix; and generate a three-dimensional second volume image on the subject on the basis of the second projection matrix and the projection image.

In an embodiment, to generate the first volume image may include: to acquire a two-dimensional coordinate value of the projection image, which corresponds to a three-dimensional coordinate value of the subject, using the first projection matrix; and to accumulate a pixel value of the two-dimensional coordinate value of the projection image to the pixel value of the three-dimensional coordinate value of the subject.

In an embodiment, to generate the DRR may include: to acquire a two-dimensional coordinate value of the DRR, which corresponds to a three-dimensional coordinate value of the subject, using the first projection matrix; and to accumulate a pixel value of a three-dimensional coordinate value of the first volume image to the pixel value of the two-dimensional coordinate value of the DRR.

In an embodiment, to generate the second projection matrix may include: to translate and rotate one of the projection image and the DRR to calculate a similarity between the projection image and the DRR; and to update the first projection matrix using a translation value and a rotation value of a case in which the similarity is a highest.

In an embodiment, the similarity may be calculated using any one of a mutual information scheme, a structural similarity index scheme, and an artificial intelligence scheme.

In an embodiment, to update the first projection matrix may include: to calculate a first transform matrix on the basis of center coordinates of the optical detector, the rotation value and the translation value; to calculate a second transform matrix on the basis of the first transform matrix and the rotation value; and to multiply the second transform matrix by the first projection matrix to calculate the second projection matrix.

In an embodiment, to generate the first volume image may include: to acquire a two-dimensional coordinate value of the projection image, which corresponds to a three-dimensional coordinate value of the subject, using the second projection matrix; and to accumulate a pixel value of the two-dimensional coordinate value of the projection image to the pixel value of the three-dimensional coordinate value of the subject.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Figure 1:
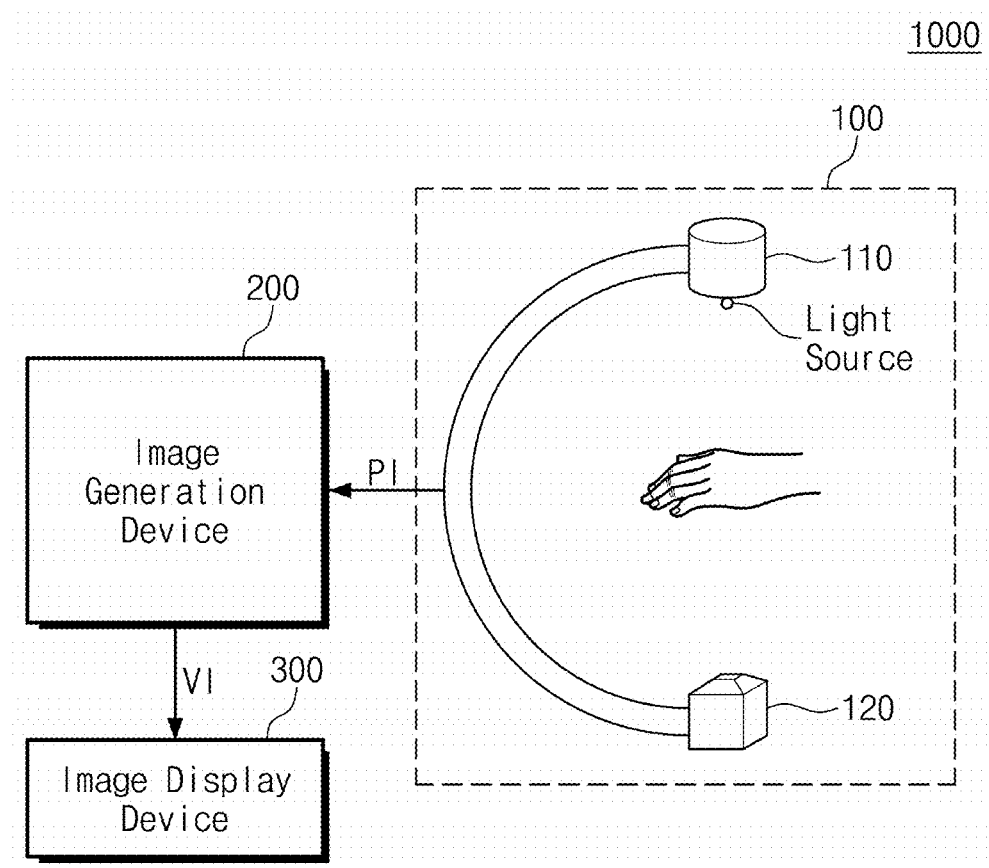
FIG. 1 illustrates a schematic diagram of an imaging system according to an embodiment of the inventive concept.

Hereinafter embodiments of the present inventive concept will be described in detail with reference to the accompanying drawings. In the following description, specific details such as detailed components and structures are provided to assist overall understanding of embodiments of the present disclosure. Therefore, various changes or modifications can be made by those of ordinary skill in the art in the specific details without departing from technical spirit and scope of the present disclosure. In addition, descriptions of well-known functions and constructions may be omitted for clarity and conciseness. Terms used herein are defined in consideration of functions of the present disclosure, and are not limited specific functions. The definitions of the terms can be determined based on details described in the specification.

Modules in the following drawing or description can be connected things other than elements shown in the drawing or described in the specification. Modules or elements can be respectively connected directly or indirectly to each other. Modules or elements can be respectively connected by communication or physical connection.

Elements described with reference to terms such as part, unit, module, or layer used in the description and functional blocks illustrated in the drawings can be implemented in a form of software, hardware, or a combination thereof. For example, the software can be machine code, firmware, embedded code, and application software. Also for example, the hardware can be electrical circuitry, electronic circuitry, processor, computer, integrated circuit, integrated circuit cores, a pressure sensor, an inertial sensor, a microelectromechanical system (MEMS), passive devices, or a combination thereof.

Unless defined otherwise, all the terms including technical or scientific terms used herein have the same meaning as those understood generally by a person having an ordinary skill in the art. The terms having the same meaning as those defined in generally used dictionaries shall be construed to have the meaning conforming to the contextual meaning of the related technologies, and shall not be construed as ideal or excessively formal meaning unless the terms are apparently defined in this application.

FIG. 1 illustrates a schematic diagram of an imaging system according to an embodiment of the inventive concept. In relation to FIG. 1, the imaging system 1000 may include a subject imaging device 100, an image generation device 200 and an image display device 300. The subject imaging device 100 may illuminate light onto a subject through a light illuminator 110, while rotating about the subject. The light illuminator 110 may illuminate the light onto the subject from a light source. The optical detector 120 may acquire two-dimensional projection images PI on the imaged subject at various angles according to the rotation of the subject imaging device 100. A projection image PI may be a two-dimensional image on the imaged subject at a specific position of the light illuminator 110 and the optical detector 120. The optical detector 120 may detect light passing through and reaching the subject, and acquire the projection image PI from the detected light. The subject imaging device 100 may provide the acquired projection images PI to the image generation device 200.

The image generation device 200 may generate a three-dimensional volume image VI on the subject from the projection images PI. The volume image VI may be a three-dimensional image on the subject generated on the basis of the two-dimensional images imaged at various positions of the light illuminator 110 and the optical detector 120. The image generation device 200 may provide the generated volume image VI to the image display device 300. The image display device 300 may display the volume image VI so that a user may visually recognize.

The subject imaging device 100, the image generation device 200 and the image display device 300 may be present in a type of a physically connected mechanism or a package. However, the embodiment of the inventive concept is not limited thereto, and the subject imaging device 100, the image generation device 200 and the image display device 300 may be present as devices physically separated from each other.

As illustrated in FIG. 1, according to the imaging system 1000 of the inventive concept, the light illuminator 110 and the optical detector 120 may be connected to one frame and revolve around fingers. The light illuminator 110 and the optical detector 120 may illuminate an X-ray onto the fingers to acquire the projection images PI on the fingers imaged at various angles. The image generation device 200 may generate a volume image VI on the finger bones on the basis of the projection images PI. However, the embodiment of the inventive concept is not limited thereto, and the imaging system 1000 may illuminate various electromagnetic waves such as an infrared ray, an ultraviolet ray, a radio wave, or a microwave to generate the three-dimensional image.

Hereinafter, for convenience of description, it is assumed that the subject imaging device 100 rotates about the subject, but the embodiment of the inventive concept is not limited thereto. For example, an embodiment of the inventive concept may also include a case in which the subject imaging device 100 is fixed and the subject rotates.

In addition, the imaging system 1000 may be a cone beam CT system, but the embodiment of the inventive concept is not limited thereto.

Figure 2:
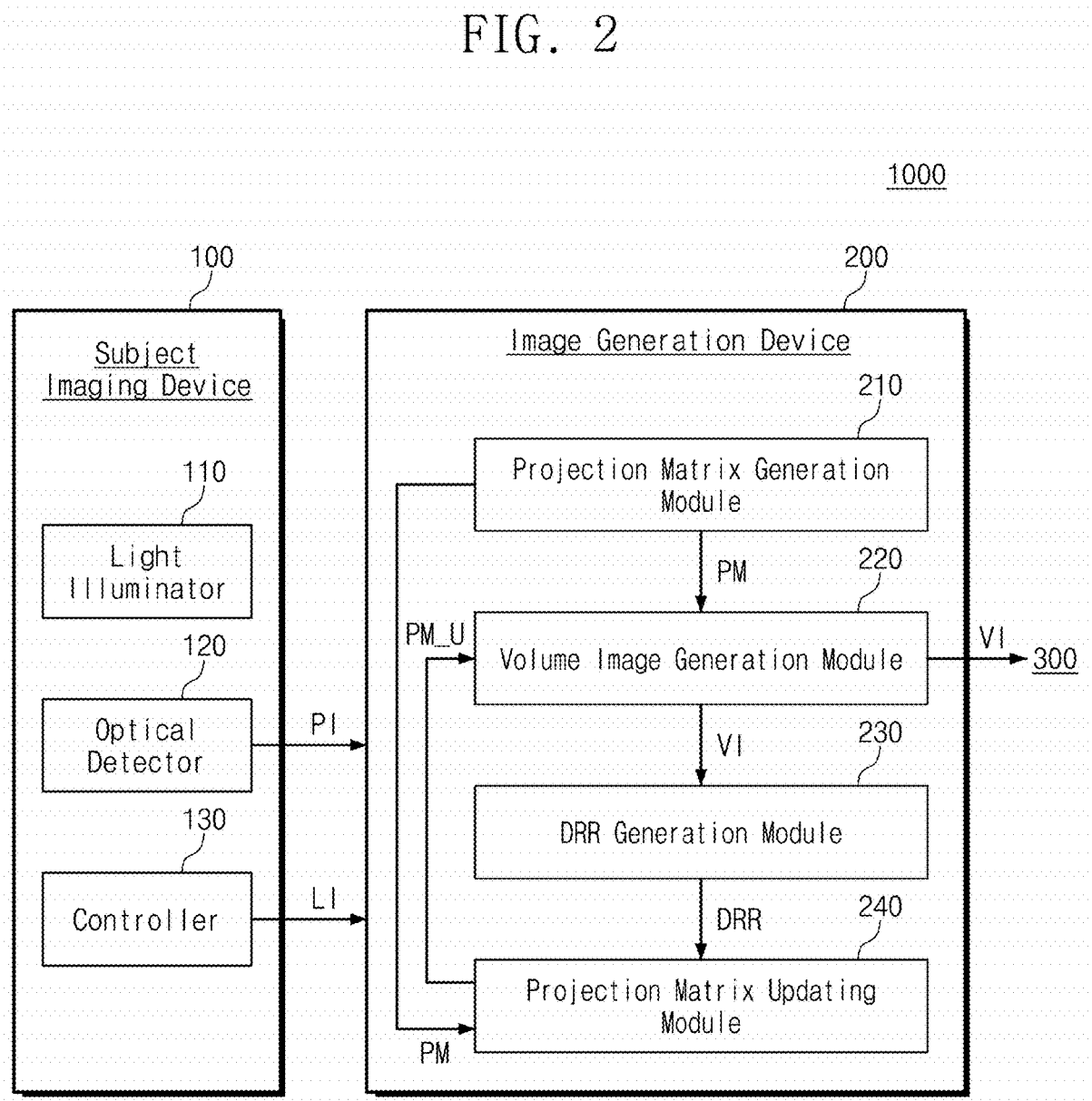
FIG. 2 is a block diagram showing the imaging system of FIG. 1.

FIG. 2 is a block diagram showing the imaging system of FIG. 1. In relation to FIG. 2, the imaging system 1000 may include the subject imaging device 100 and the image generation device 200. The subject imaging device 100 may include the light illuminator 110, the optical detector 120, and a controller 130. The light illuminator 110 may include a light source. The light illuminator 110 may illuminate light onto the subject from the light source. The light illuminator 110 may illuminate the light onto the subject at various angles while revolves around the subject. For example, the light illuminator 110 may illuminate an X-ray onto the subject.

The optical detector 120 may acquire the two-dimensional projection image PI on the subject. The optical detector 120 may detect light, which is transmitted through and reaches the subject, and acquire the projection image PI from the detected light. The optical detector 120 may acquire the projection images PI corresponding to various angles, while revolving around the subject together with the light illuminator 110. The optical detector 120 may deliver the projection images PI to the image generation device 200.

The controller 130 may control operations of the light illuminator 110 and the optical detector 120. In addition, the controller 130 may acquire position information L1 that represents the positional relationship among the light illuminator 110, the optical detector 120, and the subject. For example the position information L1 may include the distance between the light source and the optical detector 120, the distance between the light source and the center of the subject, and a revolution angle and an azimuth angle of the light source with respect to the subject.

The controller 130 may acquire varying position information L1 while controlling the light illuminator 110 and the optical detector 120 to revolve. For example, the controller 130 may control the light illuminator 110 and the optical detector 120 to revolve along a predetermined revolution orbit. In this case, the controller 130 may acquire respective pieces of the position information LI on the light illuminator 110 and the optical detector 120 according to the revolutions thereof. The controller 130 may deliver the position information L1 acquired at various positions to the image generation device 200.

In other words, a plurality of projection images PI and a plurality of pieces of position information L1 may be acquired according to the revolutions of the light illuminator 110 and the optical detector 120. When the plurality of projection images PI and the plurality of pieces of position information L1 are delivered to the image generation device 200, each of the projection images PI and each piece of the position information L1 may be matched to be delivered.

The image generation device 200 may generate a volume image VI on the subject on the basis of the plurality of projection images PI and the plurality of pieces of position information L1 delivered from the subject imaging device 100. The volume image VI may be provided to the image display device 300.

The image generation device 200 may include a projection matrix generation module 210, a volume image generation module 220, a digitally reconstructed radiograph (DRR) generation module 230, and a projection matrix updating module 240. The projection matrix generation module 210 may generate a projection matrix PM corresponding to the projection image PI. The projection matrix PM may be a set of values that represent a relationship between three-dimensional coordinates of the subject and the two-dimensional coordinates of the projection image PI. In other words, the projection matrix PM may become different according to the positional relationship among the light illuminator 110, the optical detector 120 and the subject. Accordingly, when the position of the subject is fixed, the projection matrix PM may correspond to geometrical positions of the light illuminator 110 and the optical detector 120.

The projection matrix generation module 210 may generate the projection matrix PM using the position information LI corresponding to the projection image PI. A detailed description about an operation, in which the projection matrix generation module 210 generates the projection matrix PM, will be provided later in relation to FIG. 4.

The volume image generation module 220 may generate a three-dimensional volume image VI on the subject on the basis of the projection matrices PM and the projection images PI. The volume image generation module 220 may generate the volume image VI using the plurality of projection images PI acquired at various positions of the light illuminator 110 and the optical detector 120, and the projection matrices PM that respectively correspond to the projection images PI. A detailed description about the operation in which the volume image generation module 220 generates the volume image VI will be described in relation to FIG. 5.

The DRR generation module 230 may generate a two-dimensional DRR on the subject from the volume image VI. The DRR may be generated using the projection matrix PM. In other words, the DRR generated using a specific projection matrix may be related to the projection image PI that corresponds to the specific projection matrix PM. Accordingly, the DRR may mean a virtual projection image generated by adopting the volume image VI as a virtual subject on the basis of the positions of the light illuminator 110 and the optical detector 120, when each of the projection images PI are captured. A description about the operation in which the DDR generation module 230 generates the DDR will be described in relation to FIG. 6.

The projection matrix updating module 240 may match the projection image PI and the DDR, and update the projection matrix PM using the matched result. The projection matrix updating module 240 may generate an updated projection matrix PM_U to provide the updated projection matrix PM_U to the volume image generation module 220. An operation in which the projection matrix updating module 240 updates the projection matrix PM will be described in detail in relation to FIGS. 7 and 8.

The volume image generation module 220 may generate another volume image VI on the subject on the basis of the updated projection matrix PM_U and the projection image VI. In this case, the other volume image VI may have the improved quality than the volume image VI generated on the basis of the projection matrix PM.

For example, when the volume image generation module 220 generates the volume image VI on the basis of the projection matrix PM, the quality of the volume image VI may be lowered. In order to increase the quality of the volume image VI, values (namely, the relationship between the three-dimensional coordinates of the subject and the two-dimensional coordinates of the projection image PI) represented by the projection matrix PM are required to be accurate. However, the revolution orbits of the light illuminator 110 and the optical detector 120 may become slightly different regardless of the control by the controller 130 due to structural deflection of the gantry or deformation of the rotary orbit of the gantry. In this case, the position information LI delivered from the controller 130 may be inaccurate, and the projection matrix PM generated according to the inaccurate position information LI may also be inaccurate. Accordingly, when the inaccurate projection matrix PM is present among a plurality of projection matrices, the quality of the volume image VI may be lowered.

In this way, since the projection matrix PM generated from the projection matrix generation module 210 may be inaccurate, the projection matrix updating module 240 may update the projection matrix PM to correct the values of the projection matrix PM. When the other volume image VI is generated on the basis of the updated projection matrix PM_U, the quality thereof may be improved.

As described above, the imaging system 1000 may update the projection matrix PM using the projection image PI and the DRR. In particular, the imaging system 1000 may generate one DDR corresponding to the projection image PI, and match the projection image PI and the DRR to update the projection matrix PM. Accordingly, since the imaging system 1000 generates one DRR for each of the projection images PI, the volume image VI having improved quality may be rapidly generated.

Figure 3:
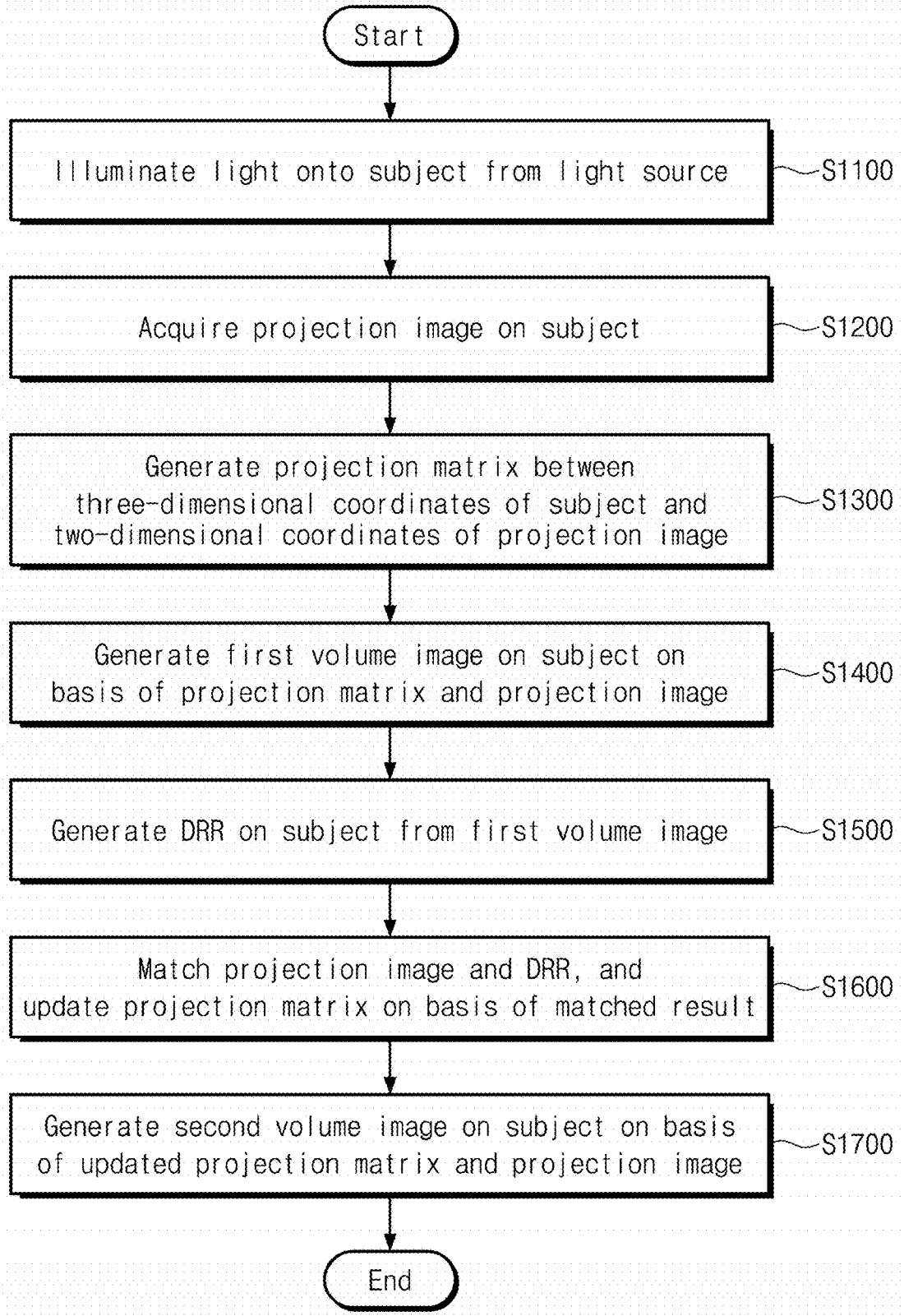
FIG. 3 is a flowchart showing an operation of the imaging system of FIG. 2.

FIG. 3 is a flowchart showing an operation of the imaging system of FIG. 2. In relation to FIGS. 2 and 3, in operation S1100, the imaging system 1000 may illuminate light onto the subject from the light source of the light illuminator 110. In operation S1200, the imaging system 1000 may acquire the projection image PI on the subject. The imaging system 1000 may acquire the projection images PI captured at various angles through the optical detector 120.

In operation S1300, the imaging system 1000 may generate the projection matrix PM that represents the relationship between the three-dimensional coordinates of the subject and the two-dimensional coordinates of the projection image PI. The imaging system 1000 may generate the projection matrix PM through the projection matrix generation module 210. The imaging system 1000 may generate the projection matrices PM respectively corresponding to the projection images PI.

In operation S1400, the imaging system 1000 may generate a first volume image VI on the subject on the basis of the projection matrices PM and the projection images PI. The imaging system 1000 may generate the first volume image VI through the volume image generation module 220. The imaging system 1000 may generate the first volume image VI using the projection images PI captured at various angles.

In operation S1500, the imaging system 1000 may generate the DRR on the subject from the first volume image VI. The imaging system 1000 may generate the DRR through the DRR generation module 230. The imaging system 1000 may generate DRRs respectively corresponding to projection images PI using projection matrices PM respectively corresponding to the projection images PI. The imaging system 1000 may generate one DRR corresponding to one projection image.

In operation S1600, the imaging system 1000 may match the projection image PI and the DRR, and update the projection matrix PM on the basis of the matched result. The imaging system 1000 may update the projection matrix PM through the projection matrix updating module 240 to generate the updated projection matrix PM_U. The imaging system 1000 may generate updated projection matrices PM_U respectively corresponding to the projection images PI.

In operation S1700, the imaging system 1000 may generate a second volume image VI on the subject on the basis of the updated projection matrix PM_U and the projection image PI. The imaging system 1000 may generate the second volume image VI through the volume image generation module 220. The quality of the second volume image VI may be higher than that of the first volume image VI.

In FIG. 2, that the imaging system 1000 is illustrated to perform operations from S1100 to S1700, but the embodiment of the inventive concept is not limited thereto. For example, the imaging system 1000 may repeatedly perform the operations from S1500 to S1700. In operation S1500, the imaging system 1000 may generate DRR from the second volume image VI. In operation S1600, the imaging system 1000 may match the projection image PI and the DRR, and update again the updated projection matrix PM_U on the basis of the matched result. In operation S1700, the imaging system 1000 may generate a third volume image VI on the basis of the projection matrix PM_U updated again and the projection image PI. In other words, when the imaging system 1000 repeatedly performs operations S1500 to S1700, the volume image VI having a higher quality may be generated. Accordingly, the imaging system 1000 may provide the user the volume image VI having the higher quality.

Figure 4:
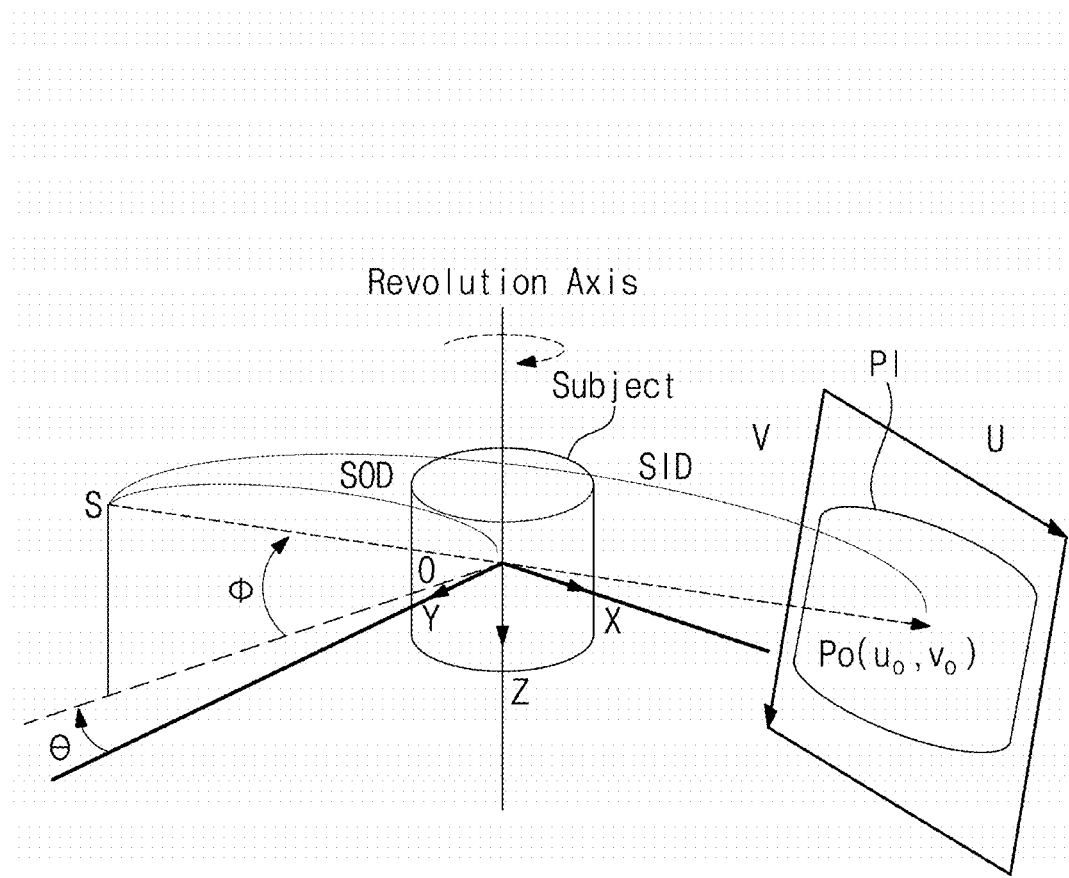
FIG. 4 illustrates a method for generating a projection matrix according to an embodiment of the inventive concept.

FIG. 4 illustrates a method for generating the projection matrix according to an embodiment of the inventive concept. In relation to FIGS. 2 and 4, the subject may be positioned between the light source S and the optical detector 120. When the light is illuminated onto the subject through the light source S, the optical detector 120 may acquire the projection image PI. The projection matrix generation module 210 may generate the projection matrix PM using the position information LI which indicates the positional relationship among the light source S, the subject or the optical detector 120. The position information LI may be calculated or acquired in advance from the controllers 130 to be delivered to the projection matrix generation module 210.

As illustrated in FIG. 4, when the position of the subject is represented on the basis of the three-dimensional (X, Y, Z) coordinates and the position of the projection image PI is represented on the basis of the two-dimensional (U, V) coordinates, the projection matrix PM may represent the relationship between a value of the three-dimensional (X, Y, Z) coordinates of the subject and a value of the two-dimensional (U, V) coordinates of the projection image PI.

The position information LI may include information on the distance SID from the light source D and the center $P_0$ of the optical detector 120, the distance SOD from the light source S to the center of the subject, a revolution angle $\theta$ of the light source S, an azimuth angle $\varphi$ of the light source S, and the center $P_0$ of the optical detector 120. A center coordinate value of the optical detector 120 may be $(u_0, v_0)$. The center coordinate value $(u_0, v_0)$ of the optical detector 120 may be the same as the center coordinate value $(u_0, v_0)$ of the projection image PI.

The light illuminator 110 including the light source S, and the optical detector 120 may revolve around a Z-axis in the clockwise direction. In this case, the center of the subject may be a point at which a line, which connects the light source S and the center $P_0$ of the optical detector 120, meets the Z-axis. For example, the center of the subject may be set as an original point of the (X, Y, Z) coordinates.

The revolution angle $\theta$ of the light source S may be an angle calculated on the basis of the Y-axis, when the light source S is vertically projected onto the X-Y plane. The azimuth angle $\varphi$ of the light source may be an angle made by the light source S and the X-Y plane.

When the revolution orbit of the light source S and the optical detector 120 is predetermined, the controller 130 may store, in advance, coordinates of the light source S and the center $P_0$ of the optical detector 120 according to the revolution orbit. Accordingly, when the position of the subject is fixed, the controller 130 may calculate the position information LI on the positional relationship among the light source S, the optical detector 120 and the subject, and provide the calculated position information LI to the projection matrix generation module 210.

The projection matrix generation module 210 may generate the projection matrix PM using the following Equation (1) on the basis of the position information LI.

$$RT = \left[ \begin{pmatrix} 1 & 0 & 0 \\ 0 & \cos(\varphi) & -\sin(\varphi) \\ 0 & \sin(\varphi) & \cos(\varphi) \end{pmatrix} \times \begin{pmatrix} \cos(\theta) & -\sin(\theta) & 0 \\ \sin(\theta) & \cos(\theta) & 0 \\ 0 & 0 & 1 \end{pmatrix} \middle| \begin{array}{c} 0 \\ -SOD \\ 0 \end{array} \right]$$

$$PM = \begin{bmatrix} SID & -u_0 & 0 \\ 0 & -v_0 & SID \\ 0 & -1 & 0 \end{bmatrix} RT \quad (1)$$

As in Equation (1), the projection matrix generation module 210 may generate a 3×4 projection matrix PM using position information LI at a specific position of the light source S and the optical detector 120. Here, the distance SID from the light source S to the center $P_0$ of the optical detector 120, and the distance SOD from the light source S to the center of the subject may be values divided by the pixel pitch that is the width or length of the pixel of the optical detector 120. In other words, the distance SID from the light source S to the center $P_0$ of the optical detector 120, and the distance SOD from the light source S to the center of the subject may be values converted into a pixel unit.

Figure 5:
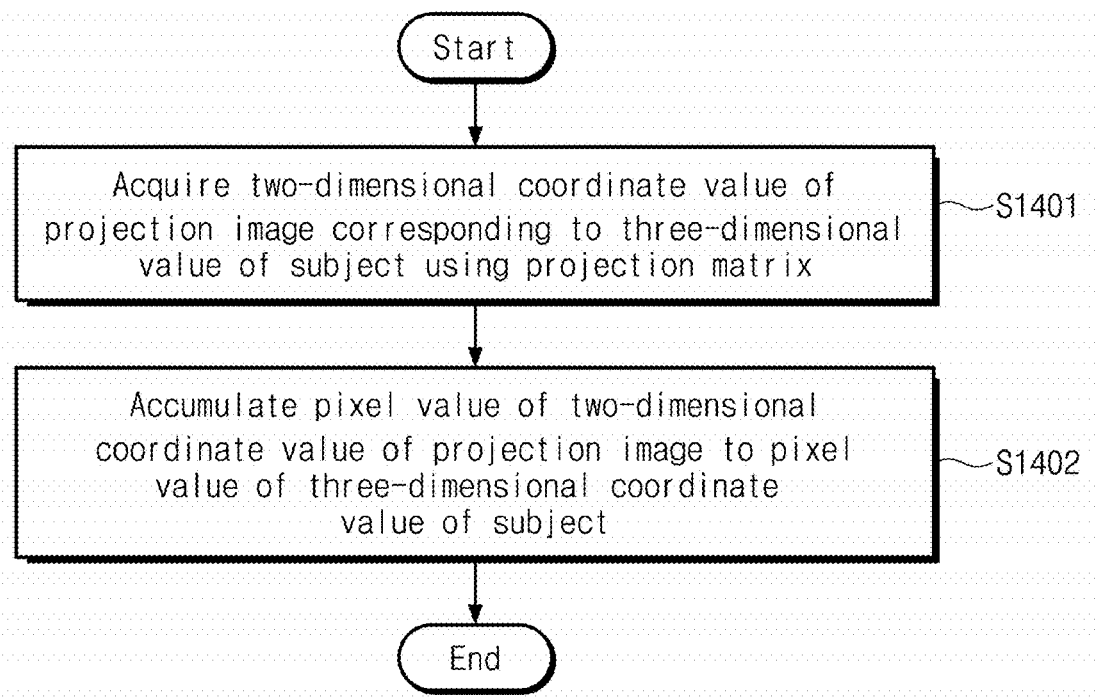
FIG. 5 is a flowchart showing a method for generating a volume image according to an embodiment of the inventive concept.

FIG. 5 is a flowchart showing a method for generating the volume image according to an embodiment of the inventive concept. In operations S1400 and S1700, the imaging system 1000 may generate the volume image VI for the subject on the basis of the projection matrix PM and the projection image PI.

In relation to FIGS. 2 and 5, in operation S1401, the volume image generation module 220 may acquire a two-dimensional coordinate value of a projection image PI which corresponds to a three-dimensional coordinate value of the subject using the projection matrix PM. As illustrated in FIG. 4, when the coordinates of the subject are expressed in (X, Y, Z) coordinates, and the coordinates of the projection image PI are expressed in (U, V) coordinates, the volume image generation module 220 may acquire the two-dimensional coordinate value corresponding to the three-dimensional coordinate value of the subject using Equation (2).

$$PM = \begin{bmatrix} x \\ y \\ z \\ 1 \end{bmatrix} = -C \begin{bmatrix} u \\ v \\ 1 \end{bmatrix} \quad (2)$$

In Equation (2), C may be a constant. As in Equation (2), the volume image generation module 220 may substitute various coordinate values (x, y, z) of the subject to obtain corresponding coordinate values (u, v) of the projection images PI.

The volume image generation module 220 may acquire coordinate values (u, v) of the projection image PI, which correspond to various coordinate values (x, y, z) of the subject, with respect to the projection matrices PM that respectively correspond to projection images PI. Accordingly, a coordinate value (u, v) of the projection image PI, which corresponds to one coordinate value (x, y, z) of the subject, may become different according to the projection matrix PM.

In operation S1402, the volume image generation module 220 may accumulate a pixel value of a two-dimensional coordinate value of the projection image PI to a corresponding pixel value of a three-dimensional coordinate value of the subject. For example, in operation S1401, when a first coordinate value $(u_1, v_1)$ of a first projection image PI is acquired which corresponds to a first coordinate value $(x_1, y_1, z_1)$ of the subject with regard to a first projection matrix PM, the volume image generation module 220 may detect a first pixel value corresponding to the first coordinate value $(u_1, v_1)$ from the first projection image PI. The volume image generation module 220 may accumulate the detected first pixel value to a pixel value of the first coordinate value $(x_1, y_1, z_1)$ of the subject. In operation S1401, when a second coordinate value $(u_2, v_2)$ of a second projection image PI is acquired which corresponds to the first coordinate value $(x_1, y_1, z_1)$ of the subject with regard to a second projection matrix PM, the volume image generation module 220 may detect a second pixel value corresponding to the second coordinate value $(u_2, v_2)$ from the second projection image PI. The volume image generation module 220 may accumulate the detected second pixel value to the pixel value of the first coordinate value $(x_1, y_1, z_1)$ of the subject. In other words, the first pixel value and the second pixel value of the projection image PI may be accumulated to the pixel value of the first coordinate value $(x_1, y_1, z_1)$ of the subject.

As described above, the volume image generation module 220 may generate the volume image VI using pixel values of the various projection images PI.

Figure 6:
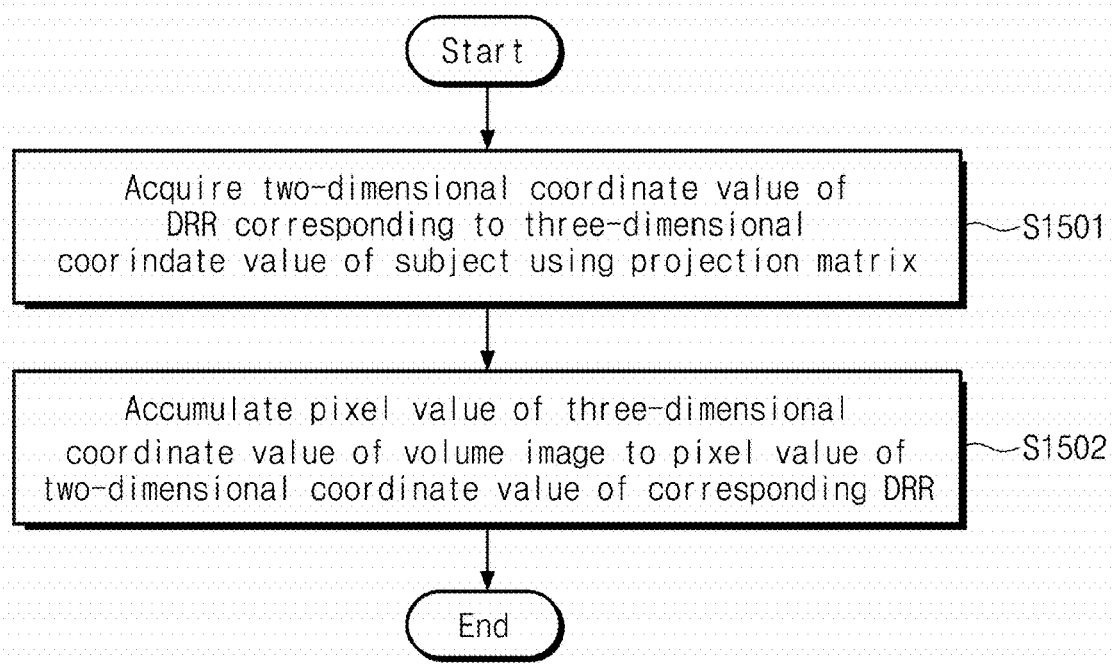
FIG. 6 is a flowchart showing a method for generating a digitally reconstructed radiograph (DRR) according to an embodiment of the inventive concept.

FIG. 6 is a flowchart showing a method for generating the DRR according to an embodiment of the inventive concept. In relation to FIGS. 2 and 6, in operation S1501, the volume image generation module 230 may acquire a two-dimensional coordinate value of the DRR, which corresponds to a three-dimensional coordinate value of the subject using the projection matrix PM. The DRR generation module 230 may substitute various coordinate values (x, y, z) of the subject to obtain corresponding coordinate values (u, v) of the DRR using Equation (2). In this case, the coordinate values (u, v) of the DRR, which correspond to different coordinate values (x, y, z) of the subject, may be identical.

In operation S1502, the DRR generation module 230 may accumulate a pixel value of the three-dimensional coordinate value of the volume image VI to a corresponding pixel value of the two-dimensional coordinate value of the DRR. For example, the DRR generation module 230 may accumulate a first pixel value of a first coordinate value $(x_1, y_1, z_1)$ of the volume image VI to a corresponding pixel value of a first coordinate value $(u_1, v_1)$ of the DRR. The DRR generation module 230 may accumulate a second pixel value of a second coordinate value $(x_2, y_2, z_2)$ of the volume image VI to the pixel value of the first coordinate value $(u_1, v_1)$ of the DRR. In other words, the first pixel value and the second pixel value of the volume image VI may be accumulated to the pixel value of the first coordinate value $(u_1, v_1)$ of the DRR.

The DRR generation module 230 may generate the DRR for each of the plurality of projection matrices PM, while performing operations S1501 and S1502. In this case, one DRR may be generated on one projection matrix. When one projection image PI is acquired, one projection matrix PM may be generated according to a positional relationship among the light source S, the optical detector 120 and the subject in FIG. 4.

Figure 7:
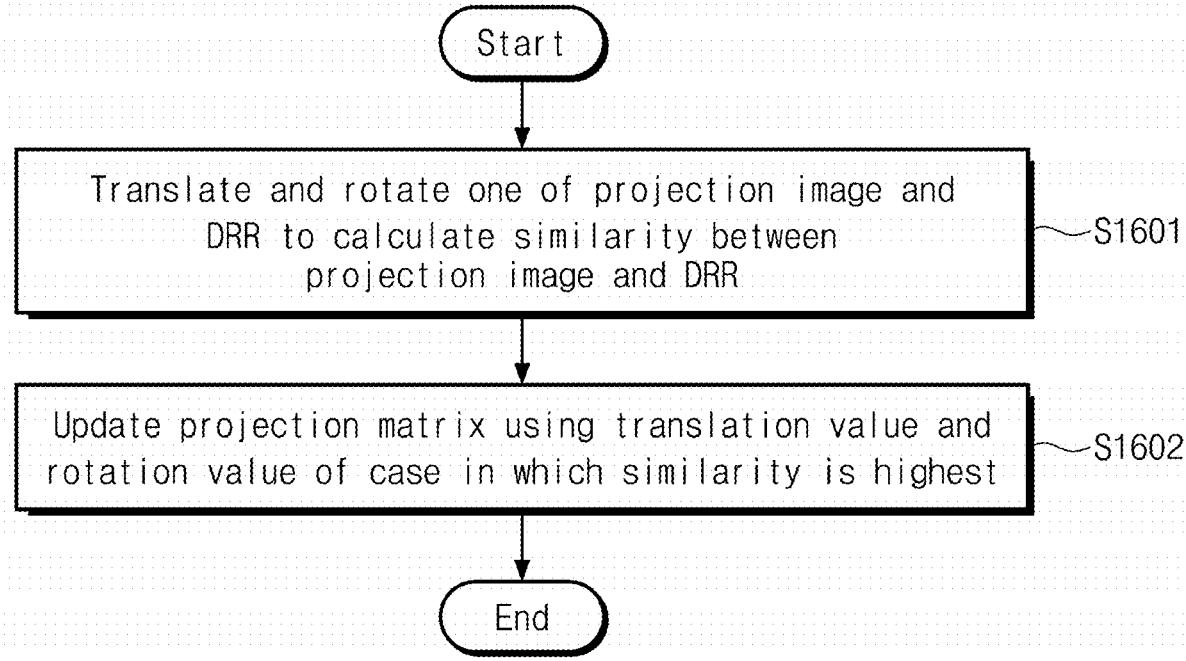
FIG. 7 is a flowchart showing a method for updating a projection matrix according to an embodiment of the inventive concept.

FIG. 7 is a flowchart showing a method for updating the projection matrix according to an embodiment of the inventive concept. In relation to FIGS. 2 and 7, the projection matrix updating module 240 may match the projection image PI and the DRR corresponding thereto. In operation S1601, the projection matrix updating module 240 may translate and rotate one of the projection image PI and the DRR to calculate a similarity between the projection image PI and the DRR. The similarity may be a value that indicates a degree of matching of the pixel values of the projection image PI and the DRR. For example, the projection matrix updating module 240 may calculate the similarity using a mutual information scheme, a structural similarity index (SSIM) scheme, or an artificial intelligence scheme.

In operation S1602, the projection update module 240 may update the projection matrix PM using the translation value and the rotation value of the case in which the similarity is the highest.

For example, the projection matrix updating module 240 may translate the DRR by a first translation value and rotate by a first rotation value (namely, a first angle) on the basis of a pixel. The projection matrix updating module 240 may match the projection image PI and the DRR translated according to the first translation value and the first rotation value to calculate a first similarity. The projection matrix updating module 240 may translate the DRR by a second translation value and rotate by a second rotation value (namely, a second angle) on the basis of a pixel. The projection matrix updating module 240 may match the projection image PI and the DRR translated according to the second translation value and the second rotation value to calculate a second similarity. When the second similarity is the highest among the calculated similarities, the projection matrix updating module 240 may update the projection matrix PM using the second translation value and the second rotation value.

The projection matrix updating module 240 may update the projection matrix PM using the following Equation (3).

$$TR = \left[ \begin{pmatrix} u_0 \\ v_0 \end{pmatrix} - \begin{pmatrix} \cos(r) & \sin(r) \\ -\sin(r) & \cos(r) \end{pmatrix} \begin{pmatrix} u_0 + Tu \\ v_0 + Tv \end{pmatrix} \right]$$

$$VAR = \begin{bmatrix} \cos(r) & \sin(r) & TRu \\ -\sin(r) & \cos(r) & TRv \\ 0 & 0 & 1 \end{bmatrix}$$

$$PM_U = VAR \times PM$$

As in Equation (3), the projection matrix updating module 240 may calculate a first transform matrix TR and calculate a second transform matrix VAR on the basis of the first transform matrix TR. The projection matrix updating module 240 may multiply the second transform matrix VAR by the projection matrix PM to generate the updated projection matrix PM_U.

Here, $u_0$ and $v_0$ may be central coordinate values of the projection image PI (namely, central coordinate value of the optical detector 120), r may be a rotation value of the case in which the similarity is the highest, Tu and Tv may be translation values of the case in which the similarity is the highest, TRu may be a first row value of the first transform matrix TR, and TRv may be a second row value of the first transform matrix TR.

As described above, the projection matrix updating module 240 may match one projection image PI and one corresponding DDR, and update the corresponding projection matrix PM on the basis of the matched result. The projection matrix updating module 240 may update the projection matrices PM respectively corresponding to the projection images PI on the basis of the DRRs respectively corresponding to the projection images PI.

Figure 8:
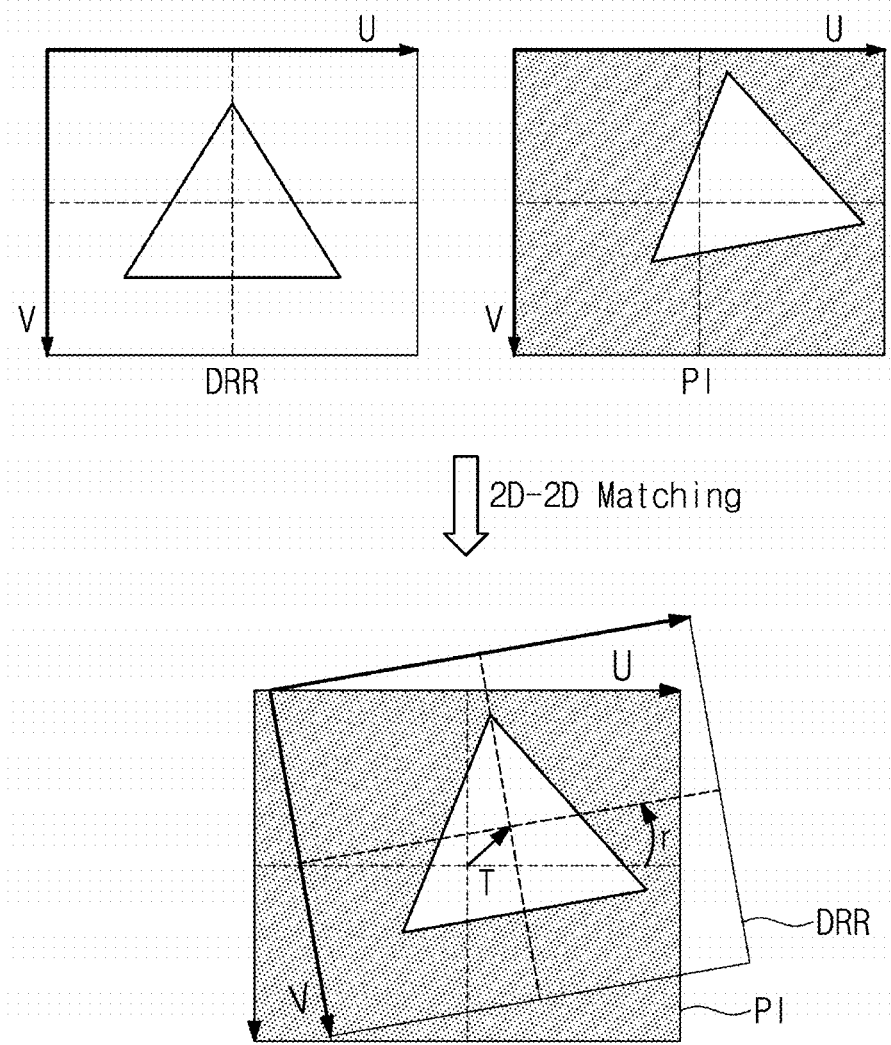
FIG. 8 illustrates an example in which a DRR is matched with a projection image according to an embodiment of the inventive concept.

FIG. 8 illustrates an example in which a DRR is matched with a projection image according to an embodiment of the inventive concept. In relation to FIG. 8, the projection matrix updating module 240 may perform 2D-2D matching on the projection image PI and the DRR. In other words, the matrix update module 240 may match the DRR and the corresponding projection image on the basis of identical two-dimensional coordinates (for example, (U, V) coordinates). As illustrated in FIG. 8, the projection matrix updating module 240 may translate (T) and rotate (r) the DRR to perform matching with the projection image PI.

As described in relation to FIG. 7, the projection matrix updating module 240 may calculate the similarity of the DRR and the projection image PI to determine whether the DRR is matched with the projection image PI. The projection update module 240 may perform 2D-2D matching by determining the translation vale and the rotation value of the case in which the similarity is the highest.

Figure 9:
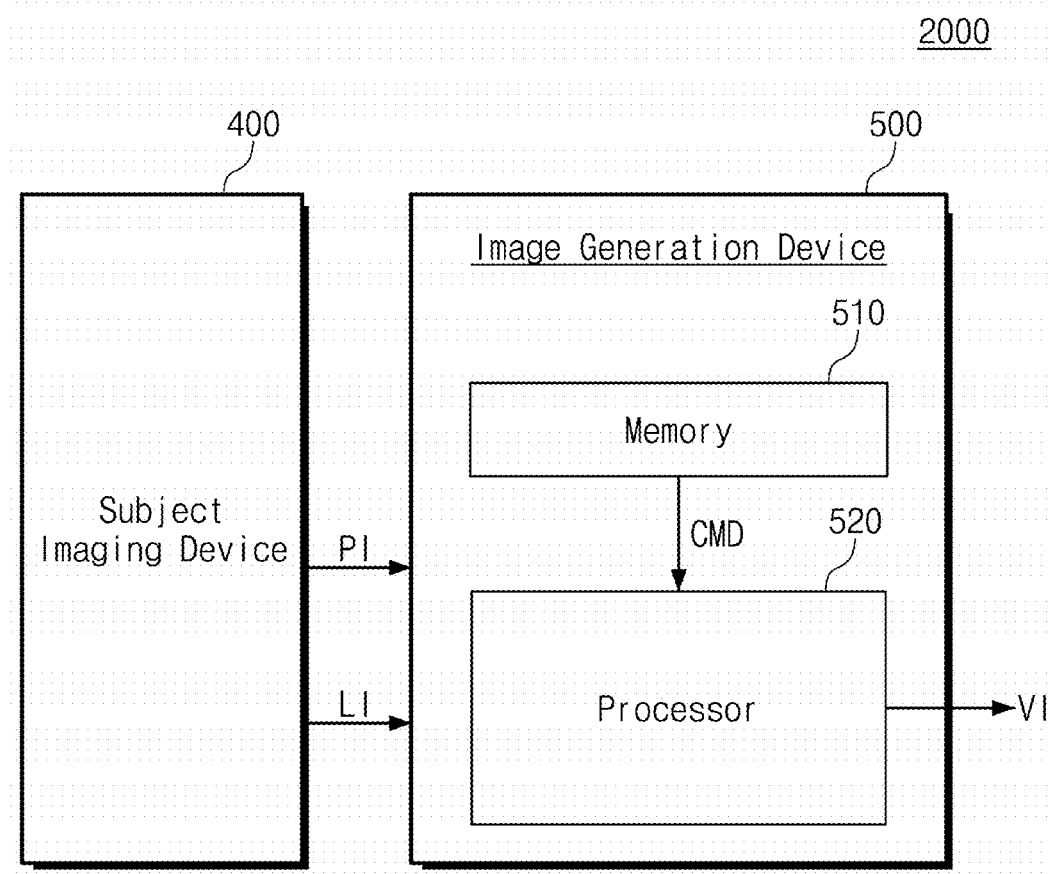
FIG. 9 is a block diagram showing an imaging system 2000 according to another embodiment of the inventive concept.

FIG. 9 is a block diagram showing an imaging system 2000 according to another embodiment of the inventive concept. In relation to FIG. 9, the imaging system 400 may include a subject imaging device 400 and an image generation device 500. Operations of the subject imaging device 400 and the image generation device 500 are similar to those of the subject imaging device 100 and the image generation device 500 of FIG. 2, and thus repeated descriptions may be omitted.

The subject imaging device 400 may illuminate light onto a subject from a light source to provide a two-dimensional projection image PI acquired through an optical detector to the image generation device 500. The subject imaging device 400 may provide position information LI that indicates a positional relationship among the light source, the subject and the optical detector to the image generation device 500.

The image generation device 500 may include a memory 510 and a processor 520. The memory 510 may store commands CMD. The processor 520 may execute the commands CMD stored in the memory 510. The processor 520 may perform an operation for generating a three-dimensional volume image VI for the subject described in relation to FIGS. 1 to 8. The processor 520 may generate the volume image VI on the subject on the basis of the projection image PI and the position information LI provided from the subject imaging device 400. In other words, the processor 520 may perform operations of the projection matrix generation module 210, the volume image generation module 220, the DRR generation module 230, and the projection matrix updating module 240 of FIG. 2.

Figure 10A:
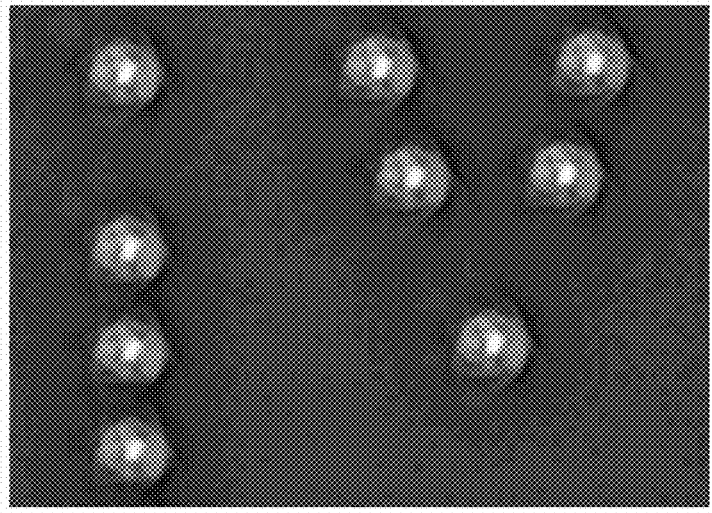
FIGS. 10A and 10B illustrate examples of volume images generated according to an embodiment of the inventive concept.
Figure 10B:
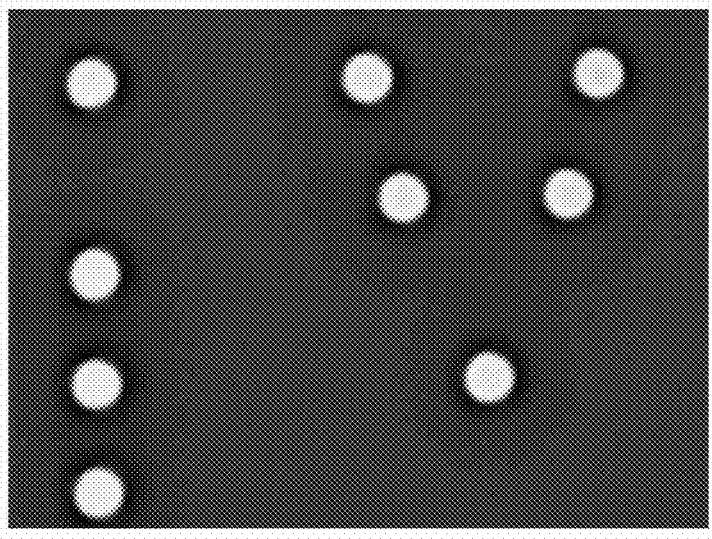

FIGS. 10A and 10B illustrate examples of volume images generated according to an embodiment of the inventive concept. In relation to FIG. 10A, a cross section of an initial volume image VI(0) generated on the basis of the projection matrix that has not been updated. As seen from the initial volume image VI(0) of FIG. 10A, a blur phenomenon may be observed. In relation to FIG. 10B, a cross section of a volume image VI(3) generated on the basis of the projection matrix which has been updated three times. As seen from the volume image VI(3) of FIG. 10B, it may be observed that the blur phenomenon of FIG. 10A is solved. In other words, when the volume image VI is generated on the basis of the updated projection matrix PM according to the embodiment of the inventive concept, the quality of the volume image VI may be improved.

As described above, the imaging system 1000 may rapidly update values of the projection matrix PM using one projection image and one DRR corresponding thereto without using a separate geometrical calibration phantom. The imaging system 1000 may rapidly generate the volume image VI of which image quality is improved on the basis of the updated projection matrix PM_U, even though the rotary orbit of the gantry is deformed.

According to the embodiments of the inventive concept, an imaging system capable of acquiring a three-dimensional image for a subject using a projection matrix may be provided.

In addition, the imaging system according to the embodiments of the inventive concept may rapidly update the projection matrix, and rapidly provide the three-dimensional image of which quality is improved using the updated projection matrix.

The above-described is detailed embodiments for practicing the present inventive concept. The present disclosure includes not only the above-described embodiments but also simply changed or easily modified embodiments. In addition, the present inventive concept also include techniques easily modified and practiced using the embodiments of the present disclosure. Therefore, the scope of the present disclosure is not limited to the described embodiments but is defined by the claims and their equivalents.

What is claimed is:

1. An operating method of an imaging system, the operating method comprising:
    illuminating, by a light illuminator, light onto a subject from a light source;
    acquiring, by an optical detector, a two-dimensional projection image on the subject;
    generating a first projection matrix between three-dimensional coordinates of the subject and two-dimensional coordinates of the projection image;
    generating a three-dimensional first volume image on the subject on a basis of the first projection matrix and the projection image;
    generating a two-dimensional digitally reconstructed radiograph (DRR) on the subject from the first volume image;
    matching the projection image and the DRR, and updating the first projection matrix on a basis of a matched result to generate a second projection matrix; and
    generating a three-dimensional second volume image on the subject on a basis of the second projection matrix and the projection image.

2. The operating method of claim 1, wherein the projection matrix is generated using a distance from the optical source to a center of the optical detector, a distance from the light source and a center of the subject, a revolution angle of the light source, an azimuth angle of the light source, and center coordinates of the optical detector, and
    when three-dimensional coordinates of the subject is expressed in (X, Y, Z) coordinates and the light illuminator and the optical detector revolve around a Z-axis, the center of the subject is a point at which a line, which connects the light source and the center of the optical detector, meets the Z-axis, the revolution angle is an angle calculated on a basis of a Y-axis when the light source is vertically projected onto an X-Y plane, and the azimuth angle is an angle made by the light source and the X-Y plane.

3. The operating method of claim 1, wherein the generating of the first volume image comprises:
    acquiring a two-dimensional coordinate value of the projection image, which corresponds to a three-dimensional coordinate value of the subject, using the first projection matrix; and
    accumulating a pixel value of the two-dimensional coordinate value of the projection image to a pixel value of the three-dimensional coordinate value of the subject.

4. The operating method of claim 1, wherein the generating of the DRR comprises:
    acquiring a two-dimensional coordinate value of the DRR, which corresponds to a three-dimensional coordinate value of the subject, using the first projection matrix; and
    accumulating a pixel value of a three-dimensional coordinate value of the first volume image to a pixel value of the two-dimensional coordinate value of the DRR.

5. The operating method of claim 1, wherein the generating of the second projection matrix comprises:
    translating and rotating one of the projection image and the DRR to calculate a similarity between the projection image and the DRR; and
    updating the first projection matrix using a translation value and a rotation value of a case where the similarity is a highest.

6. The operating method of claim 5, wherein the updating of the first projection matrix comprises:
    calculating a first transform matrix on a basis of center coordinates of the optical detector, the rotation value and the translation value;
    calculating a second transform matrix on a basis of the first transform matrix and the rotation value; and
    multiplying the second transform matrix by the first projection matrix to calculate the second projection matrix.

7. The operating method of claim 6, wherein the first transform matrix is $$TR = \left[ \begin{pmatrix} u_0 \\ v_0 \end{pmatrix} - \begin{pmatrix} \cos(r) & \sin(r) \\ -\sin(r) & \cos(r) \end{pmatrix} \begin{pmatrix} u_0 + Tu \\ v_0 + Tv \end{pmatrix} \right],$$

the second transform matrix is $$VAR = \begin{bmatrix} \cos(r) & \sin(r) & TRu \\ -\sin(r) & \cos(r) & TRv \\ 0 & 0 & 1 \end{bmatrix}$$

wherein $u_0$ and $v_0$ denote the central coordinate values of the optical detector, r denotes the rotation value, Tu and Tv denote translation values, TRu denotes a first row value of the first transform matrix, and TRv denotes a second row value of the first transform matrix.

8. The operating method of claim 1, wherein the generating of the second volume image comprises:
    acquiring a two-dimensional coordinate value of the projection image, which corresponds to a three-dimensional coordinate value of the subject, using the second projection matrix; and accumulating a pixel value of the two-dimensional coordinate value of the projection image to a pixel value of the three-dimensional coordinate value of the subject.

9. An imaging system comprising:
a light illuminator configured to illuminate light onto a subject from a light source;
an optical detector configured to acquire a two-dimensional projection image on the subject; and
an image generation device configured to generate a three-dimensional volume image on the subject on a basis of the projection image,
wherein the image generation device comprises:
a projection matrix generation module configured to generate a first projection matrix between three-dimensional coordinates of the subject and two-dimensional coordinates of the projection image;
a volume image generation module configured to generate a three-dimensional first volume image on the subject on a basis of the first projection matrix and the projection image;
a DRR generation module configured to generate a two-dimensional DRR on the subject from the first volume image; and
a projection matrix updating module configured to match the projection image and the DRR, and update the first projection matrix on a basis of a matched result to generate a second projection matrix,
wherein the volume image generation module further generates a three-dimensional second volume image on the subject on a basis of the second projection matrix and the projection image.

10. The imaging system of claim 9, wherein the volume image generation module is configured to:
acquire the two-dimensional coordinate value of the projection image, which corresponds to the three-dimensional coordinate value of the subject using the first projection matrix, and accumulate a pixel vale of the two-dimensional coordinate value of the projection image to a pixel value of the three-dimensional coordinate value of the subject to generate the first volume image; and
acquire the two-dimensional coordinate value of the projection image, which corresponds to the three-dimensional coordinate value of the subject, using the second projection matrix, and accumulates a pixel vale of the two-dimensional coordinate value of the projection image to a pixel value of the three-dimensional coordinate value of the subject to generate the second volume image.

11. The imaging system of claim 9, wherein the projection matrix updating module is configured to:
translate and rotate one of the projection image and the DRR to calculate a similarity between the projection image and the DRR; and
update the first projection matrix using a translation value and a rotation value of a case in which the similarity is a highest.

12. The imaging system of claim 11, wherein the projection matrix updating module is configured to:
calculate the first transform matrix on a basis of the central coordinates of the optical detector, the translation value and the rotation value;
calculate the second transform matrix on a basis of the first transform matrix and the rotation value; and
multiply the second transform matrix by the first projection matrix to calculate the second projection matrix.

13. An image generation device, which generates a three-dimensional volume image on a subject from a two-dimensional projection image acquired by illuminating light onto the subject, the image generation device comprising:
a processor; and
a memory connected to the processor,
wherein the memory stores commands, and when the commands are executed by the processor, the commands cause the processor to:
generate a first projection matrix between three-dimensional coordinates of the subject and two-dimensional coordinates of the projection image;
generate a three-dimensional first volume image on the subject on a basis of the first projection matrix and the projection image;
generate a two-dimensional DRR on the subject from the first volume image;
match the projection image and the DRR, and update the first projection matrix on a basis of a matched result to generate a second projection matrix; and
generate a three-dimensional second volume image on the subject on a basis of the second projection matrix and the projection image.

14. The image generation device of claim 13, wherein to generate the first volume image comprises:
to acquire a two-dimensional coordinate value of the projection image, which corresponds to a three-dimensional coordinate value of the subject, using the first projection matrix; and
to accumulate a pixel value of the two-dimensional coordinate value of the projection image to a pixel value of the three-dimensional coordinate value of the subject.

15. The image generation device of claim 13, wherein to generate the DRR comprises:
to acquire a two-dimensional coordinate value of the DRR, which corresponds to a three-dimensional coordinate value of the subject, using the first projection matrix; and
to accumulate a pixel value of the three-dimensional coordinate value of the first volume image to a pixel value of the two-dimensional coordinate value of the DRR.

16. The image generation device of claim 13, wherein to generate the second projection matrix comprises:
to translate and rotate one of the projection image and the DRR to calculate a similarity between the projection image and the DRR; and
to update the first projection matrix using a translation value and a rotation value of a case in which the similarity is a highest.

17. The image generation device of claim 16, wherein the similarity is calculated using one of a mutual information scheme, a structural similarity index scheme, and an artificial intelligence scheme.

18. The imaging system of claim 16, wherein to update the first projection matrix comprises:
to calculate a first transform matrix on a basis of center coordinates of the optical detector, the rotation value and the translation value;
to calculate a second transform matrix on a basis of the first transform matrix and the rotation value; and
to multiply the second transform matrix by the first projection matrix to calculate the second projection matrix.

19. The imaging system of claim 13, wherein to generate the first volume image comprises:

to acquire a two-dimensional coordinate value of the projection image, which corresponds to a three-dimensional coordinate value of the subject, using the second projection matrix; and
to accumulate a pixel value of the two-dimensional coordinate value of the projection image to a pixel value of the three-dimensional coordinate value of the subject.

* * * * *